Nov. 3, 1925.

G. EDMISTER

TREE STAND

Filed May 26, 1925

1,559,563

WITNESSES

INVENTOR
G. EDMISTER,
BY
ATTORNEYS

Patented Nov. 3, 1925.

1,559,563

UNITED STATES PATENT OFFICE.

GEORGE EDMISTER, OF LINCOLN, NEBRASKA.

TREE STAND.

Application filed May 26, 1925. Serial No. 32,980.

*To all whom it may concern:*

Be it known that I, GEORGE EDMISTER, a citizen of the United States, and a resident of Lincoln, in the county of Lancaster and State of Nebraska, have invented certain new and useful Improvements in Tree Stands, of which the following is a specification.

My present invention relates generally to tree stands and more particularly to a small holder for Christmas trees and the like which may be easily and quickly mounted in effective position, which may be readily concealed in use and which may be packed away in minimum storage space between periods of use.

My invention also comprises a tree stand of simple, inexpensive construction which will be strong, durable and effective in use.

In the accompanying drawing which illustrates my present invention and forms a part of the specification.

Figure 1:
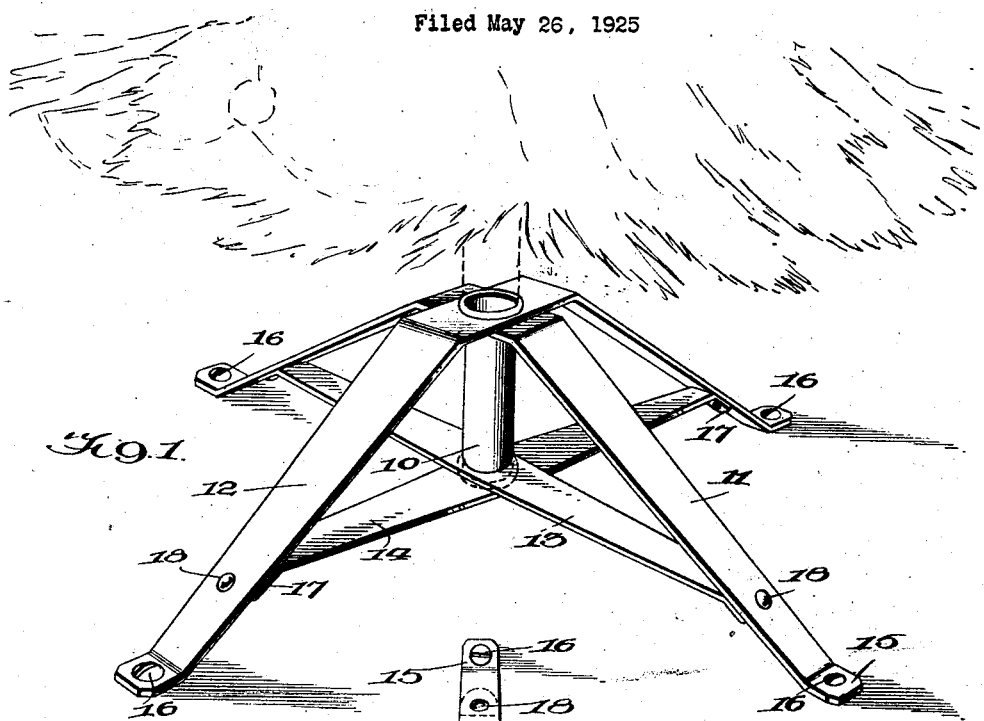
Figure 2:
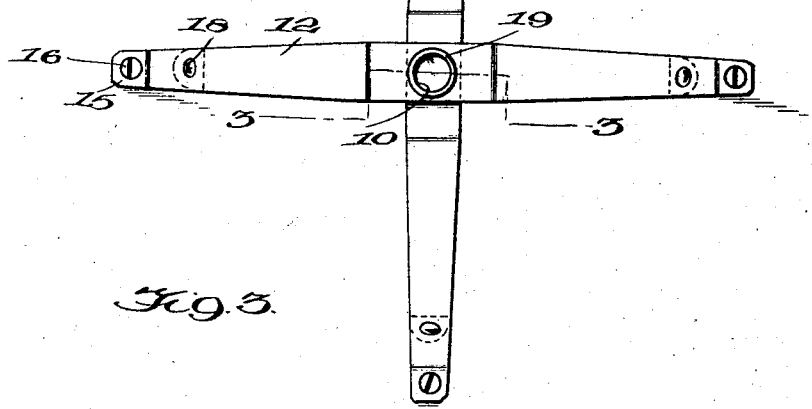
Figure 3:
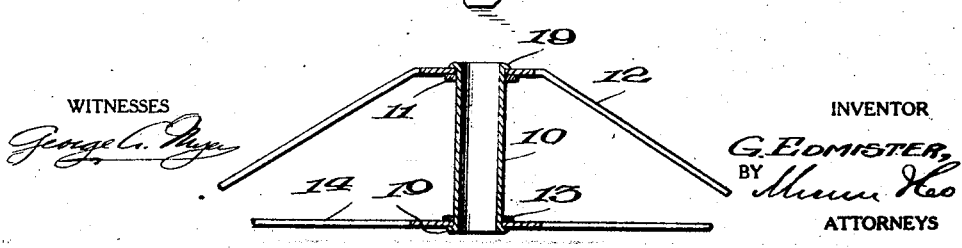

Figure 1 is a perspective view illustrating the practical application of my invention, Figure 2 is a top plan view of the tree stand proposed by my invention, Figure 3 is a vertical section therethrough, taken on line 3—3 of Figure 2.

Referring now to these figures my invention proposes a tree stand which includes a tubular upright holder 10 into which the lower end or butt of a tree may be readily disposed as indicated in dotted lines in Figure 1, after slightly tapering such tree butt so that it may be forced or wedged into the tubular holder at the upper end of the latter.

The tubular holder 10 is supported by virtue of extension of its upper and lower ends vertically through the central crossing portions of supporting arms 11 and 12 and bracing arms 13 and 14.

The supporting arms 11 and 12 are of inverted U-shape, with their flat central portions crossing one another and with their depending and diverging extensions provided at their lower ends with outwardly projecting angular feet 15, apertured for the reception of screws or like fastening members 16 by means of which the supporting arms are secured to the surface of a floor or other support.

The bracing arms 13 and 14 on the other hand are flat substantially throughout and extend horizontally between the extensions of the supporting arms 11 and 12 to the latter of which the ends of the bracing arms are securely fastened by virtue of short angular extensions 17 at the ends of the bracing arms and connecting rivets and the like 18 fixed through these short extensions 17 and also through the supporting arms 11 and 12.

The tubular holder 10 has its opposite ends rolled as at 19 above the supporting arms 11 and 12 and below the bracing arms 13 and 14 and it is preferable that this holder extend through the supporting and bracing arms in a sufficiently loose manner to constitute a pivot on which the supporting and bracing arms are shiftable in a rotary direction with respect to one another in order that the stand as a whole may not only be adapted to any inequalities in the supporting surface and the like but may also be folded to some extent when not in use in order to minimize the space required for its storage.

It is obvious from the foregoing that the stand as proposed by my invention may be readily and inexpensively constructed, will be durable and effective in use, and is otherwise well adapted to the carrying out of the objects as above stated.

I claim:

1. A tree stand including inverted U-shaped supporting arms crossing one another at their centers and having depending extensions provided with outer angular feet, brace arms also crossing one another at their centers and extending horizontally between the extensions of the supporting arms and rigidly attached thereto, and a tubular holder mounted centrally and vertically through the crossing central portions of the supporting and brace arms.

2. A tree stand including inverted U-shaped supporting arms crossing one another at their centers and having depending extensions provided with outer angular feet, brace arms also crossing one another at their centers and extending horizontally between the extensions of the supporting arms and rigidly attached thereto, and a tubular holder mounted centrally and vertically through the crossing central portions of the supporting and brace arms and having a rolled upper end above the former and a rolled lower end below the latter.

3. A tree stand including inverted U- shaped supporting arms crossing one another at their centers and having depending extensions provided with outer angular feet, brace arms also crossing one another at their centers and extending horizontally between the extensions of the supporting arms and rigidly attached thereto, and a tubular holder mounted centrally and vertically through the crossing central portions of the supporting and brace arms and loosely engaging the supporting and bracing arms whereby to form a pivot upon which the supporting arms with their bracing arms are swingable relative to one another.

GEORGE EDMISTER.